(12) United States Patent
Karaoguz et al.

(10) Patent No.: US 8,199,705 B2
(45) Date of Patent: Jun. 12, 2012

(54) SYSTEM AND METHOD FOR PROVIDING A WIRELESS ACCESS POINT (WAP) HAVING MULTIPLE INTEGRATED TRANSCEIVERS FOR USE IN A HYBRID WIRED/WIRELESS NETWORK

(75) Inventors: Jeyhan Karaoguz, Irvine, CA (US); Nambirajan Seshadri, Irvine, CA (US); Ed H. Frank, Atherton, CA (US)

(73) Assignee: Broadcom Corporation, Irvine, CA (US)

( * ) Notice: Subject to any disclaimer, the term of this patent is extended or adjusted under 35 U.S.C. 154(b) by 1186 days.

(21) Appl. No.: 10/658,727

(22) Filed: Sep. 9, 2003

(65) Prior Publication Data

US 2004/0052252 A1   Mar. 18, 2004

Related U.S. Application Data (60) Provisional application No. 60/433,118, filed on Dec. 13, 2002, provisional application No. 60/411,261, filed on Sep. 17, 2002, provisional application No. 60/411,301, filed on Sep. 17, 2002.

(51) Int. Cl.
*H04W 4/00* (2009.01)
(52) U.S. Cl. .......................... 370/329; 370/400
(58) Field of Classification Search ............ 370/328, 370/329, 331, 338, 349, 352, 389, 400, 401
See application file for complete search history.

(56) References Cited

U.S. PATENT DOCUMENTS

| | | | |
|---|---|---|---|
| 5,940,598 A | 8/1999 | Strauss et al. | |
| 7,035,932 B1 * | 4/2006 | Dowling | 709/230 |
| 7,039,027 B2 * | 5/2006 | Bridgelall | 370/329 |
| 7,058,040 B2 * | 6/2006 | Schmidt | 370/337 |
| 2002/0045435 A1 * | 4/2002 | Fantaske | 455/403 |
| 2003/0035437 A1 * | 2/2003 | Garahi et al. | 370/465 |
| 2004/0039817 A1 * | 2/2004 | Lee et al. | 709/225 |

FOREIGN PATENT DOCUMENTS

| | | |
|---|---|---|
| DE | 100 38 484 | 1/2002 |
| GB | 2 320 653 | 6/1998 |
| WO | WO 03009527 | 1/2003 |

OTHER PUBLICATIONS

Supplementary European Search Report corresponding to European Patent Application Serial No. 03797889.7-1249, dated Mar. 24, 2010.
EPO Communication dated Nov. 30, 2010 in Application No. 04010591.8-1244 / 1492272.

\* cited by examiner

*Primary Examiner* — Jung Park
(74) *Attorney, Agent, or Firm* — Thomas, Kayden, Horstmeyer & Risley, LLP (57) ABSTRACT

The method may include determining a protocol associated with a communication signal for an access point. A compatible processor may be allocated and selected from a pool of available processors and subsequently utilized to process the communication signal. In one aspect of the invention, a processor may be made compatible by updating it with compatible protocol code that may be used for processing the communication signal. The compatible protocol code may be downloaded to the processor from a memory. The processor may associate a particular protocol code with a particular portion of the memory. Accordingly, the protocol code may be retrieved from the memory based on the association. The processor may be a digital signal processor (DSP), which may be adapted to process 802.11a, 802.11b, 802.11g and Bluetooth protocols, for example.

30 Claims, 8 Drawing Sheets

SYSTEM AND METHOD FOR PROVIDING A WIRELESS ACCESS POINT (WAP) HAVING MULTIPLE INTEGRATED TRANSCEIVERS FOR USE IN A HYBRID WIRED/WIRELESS NETWORK

CROSS-REFERENCE TO RELATED APPLICATIONS/INCORPORATION BY REFERENCE

This application makes reference to, claims priority to, and claims the benefit of: U.S. Provisional Application Ser. No. 60/433,118 entitled "System and Method for Providing a Wireless Access Point (WAP) Having Multiple Integrated Transceivers for Use in a Hybrid Wired/Wireless Network" filed on Dec. 13, 2002;

U.S. Provisional Patent Application Ser. No. 60/411,261 entitled "Communications Systems Software and Protocols" filed on Sep. 17, 2002; and U.S. Provisional Patent Application Ser. No. 60/411,301 entitled "Method and System for Providing a Scalable Integrated Switch and Wireless Architecture" filed on Sep. 17, 2002.

U.S. application Ser. No. 10/606,565 entitled "Method and System for Providing A Mesh Network Using a Plurality of Wireless Access Points" filed on Jun. 26, 2003;

U.S. patent application Ser. No. 10/658,514 entitled "Method and System for Network Management in a Hybrid Wired/Wireless Network" filed on Sep. 9, 2003; and U.S. patent application Ser. No. 10/658,161 entitled "Method and System for Providing a Super Channel in a Multi-band Multi-protocol Hybrid Wired/Wireless Network" filed on Sep. 9, 2003.

The above stated applications are all incorporated herein by reference in their entirety.

FIELD OF THE INVENTION

Embodiments of the present application relate generally to hybrid wired/wireless networking, and more particularly to a method and system for providing a wireless access point (WAP) having multiple integrated transceivers for use in a multi-band multi-protocol hybrid wired/wireless network.

BACKGROUND OF THE INVENTION

Figure 1A:
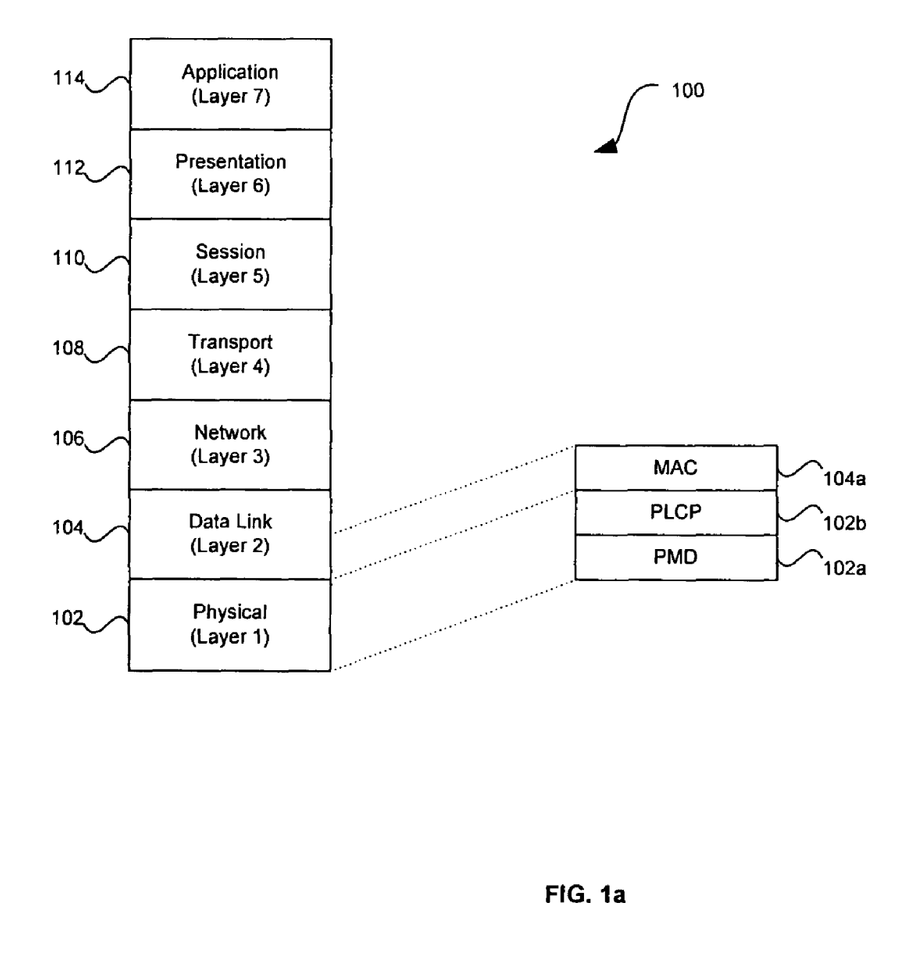
FIG. 1a is a block diagram of the OSI model.

The Open Systems Interconnection (OSI) model promulgated by the International standards organization (ISO) was developed to establish standardization for linking heterogeneous computer and communication systems. The OSI model describes the flow of information from a software application of a first computer system to a software application of a second computer system through a network medium. FIG. 1a is a block diagram 100 of the OSI model. Referring to FIG. 1a, the OSI model has seven distinct functional layers including layer 7, an application layer 114; layer 6, a presentation layer 112; layer 5, a session layer 110; layer 4, a transport layer 108, layer 3, a network layer 106; layer 2: a data link layer 104; and layer 1, a physical layer 102. The physical layer 102 may further include a physical layer convergence procedure (PLCP) sublayer 102b and a physical media dependent sublayer 102a. The data link layer 104 may also include a Medium access control (MAC) layer 104a.

In general, each OSI layer describes certain tasks which are necessary for facilitating the transfer of information through interfacing layers and ultimately through the network. Notwithstanding, the OSI model does not describe any particular implementation of the various layers. OSI layers 1 to 4 generally handle network control and data transmission and reception, generally referred to as end-to-end network services. Layers 5 to 7 handle application issues, generally referred to as application services. Specific functions of each layer may vary depending on factors such as protocol and/or interface requirements or specifications that are necessary for implementation of a particular layer. For example, the Ethernet protocol may provide collision detection and carrier sensing in the physical layer. Layer 1, the physical layer 102, is responsible for handling all electrical, optical, opto-electrical and mechanical requirements for interfacing to the communication media. Notably, the physical layer 102 may facilitate the transfer of electrical signals representing an information bitstream. The physical layer 102 may also provide services such as, encoding, decoding, synchronization, clock data recovery, and transmission and reception of bit streams.

The PLCP layer 102b may be configured to adapt and map services provided by the physical layer 102 to the functions provided by the device specific PMD sublayer 102a. Specifically, the PLCP layer 102b may be adapted to map PHY sublayer service data units (PDSUs) into a suitable packet and/or framing format necessary for providing communication services between two or more entities communicating via the physical medium. The PMD layer 102a specifies the actual methodology and/or protocols which may be used for receiving and transmitting via the physical medium. The MAC sublayer 104a may be adapted to provide, for example, any necessary drivers which may be utilized to access the functions and services provided by the PLCP sublayer 102b. Accordingly, higher layer services may be adapted to utilize the services provided by the MAC sublayer 104a with little or no dependence on the PMD sublayer 102a.

802.11 is a suite of specifications promulgated by the Institute of Electrical and Electronics Engineers (IEEE), which provide communication standards for the MAC and physical (PHY) layer of the OSI model. The 801.11 standard also provides communication standards for wired and wireless local area networks (WLANs). More specifically, the 802.11 standard specifies five (5) types of physical layers for WLANs. These include, frequency hopping spread spectrum (FHSS), direct sequence spread spectrum (DSSS), infrared (IR) communication, high rate direct sequence spread spectrum (HR-DSS) and orthogonal frequency division multiplexing (OFDM). The 802.11 standard also provides a PLCP frame format for each of the specified PHY layers.

Over the past decade, demands for higher data rates to support applications such as streaming audio and streaming video, have seen Ethernet speeds being increased from about 1-2 megabit per second (Mbps), to 10 Mbps, to 100 Mbps, to 1 gigabit per second (Gbps) to 10 Gbps. Currently, there are a number of standards in the suite of specifications, namely 802.11b, 802.11a and 802.11g which have been adapted to facilitate the demands for increased data rates. The 802.11g standard for example, provides a maximum data rate of about 54 Mbps at a transmitter/receiver range of about 19 meters (m) or so in a frequency range of 2.4 GHz to 2.4835 GHz. The 802.11b standard for example, provides a maximum data rate of about 11 Mbps at a transmitter/receiver range of 57 meters (m) in a frequency range of 2.4 GHz to 2.4835 GHz. Finally, the 802.11a standard for example, may be adapted to provide a maximum data rate of about 54 Mbps at a transmitter/receiver range of 12 meters (m) in a 300 MHz segmented bandwidth ranging from 5.150 GHz to 5.350 GHz and from 5.725 GHz to 5.825 GHz.

The 802.11 standard forms the basis of the other standards in the suite of specifications, and the 802.11b, 802.11a and 802.11g standards provide various enhancements and new features to their predecessor standards. Notwithstanding, there are certain elementary building blocks that are common to all the standards in the suite of specifications. For example, all the standards in the suite of specifications utilize the Ethernet protocol and utilize carrier sense multiple access with collision avoidance (CSMA/CA).

CSMA/CA utilizes a simple negotiation scheme to permit access to a communication medium. If a transmitting entity wishes to transmit information to a receiving entity, the transmitting entity may sense the communication medium for communication traffic. In a case where the communication medium is busy, the transmitting entity may desist from making a transmission and attempt transmission at a subsequent time. In a case where the communication transmission is not busy, then the transmitting entity may send information over the communication medium. Notwithstanding, there may be a case where two or more transmission entities sense that the communication medium is not busy and attempt transmission at the same instant. To avoid collisions and retransmissions, a CSMA/OA or a ready to send (RTS) and clear to send (CTS) messaging scheme may be employed, for example. Accordingly, whenever a transmitting device senses that the communication medium is not busy, then the transmitting device may send a ready to send message to one or more receiving device. Subsequent to the receipt of the ready to send message, the receiving device may send a clear to send message. Upon receipt of the clear to send message by the transmitting device, the transmitting device may initiate transfer of data to the receiving device. Upon receiving packets or frames from the transmitting device, the receiving device may acknowledge the received frames.

The 802.11b standard, commonly called Wi-Fi, which represents wireless fidelity, is backward compatible with its predecessor standard 802.11. Although 802.11 utilizes one of two modulation formats including direct sequence spread spectrum (DSS) using differential binary phase shift keying and frequency hopping spread spectrum (11-bit Barker sequence), 802.11b utilizes a higher data rate form of DSS called complementary code keying (CCK). CCK permits higher data rate and particularly less susceptible to interference effects such as multipath-propagation interference, the PSK.

802.11a utilizes orthogonal frequency-division multiplexing (OFDM) modulation/encoding scheme, which provides a maximum data rate 54 Mbps. Orthogonal frequency-division multiplexing is a digital modulation technique which splits a signal into several narrowband channels, with each channel having a different frequency. Each narrowband channel is arranged so as to minimize the effects of crosstalk between the channels and symbols in the data stream.

Since equipment designed to provide support for 802.11a operates at frequencies in the ranges 5.150 GHz to 5.350 GHz and from 5.725 GHz to 5.825 GHz, 802.11a equipment will not interoperate with equipment designed to operate with the 802.11b standard which defines operation in the 2.4 to 2.4835 GHz frequency band. One major drawback is that companies that have invested in 802.11b equipment and infrastructure may not readily upgrade their network without significant expenditure.

The 802.11g standard was developed as an extension to 802.11b standard. The 802.11g standard may utilize a similar OFDM modulation scheme as the 802.11a standard and delivers speeds comparable with the 802.11a standard. Since 802.11g compatible equipment operates in the same portion of the electromagnetic spectrum as 802.11b compatible equipment, 802.11g is backwards compatible with existing 802.11b WLAN infrastructures. Due to backward compatibility of 802.11g with 802.11b, it would be desirable to have an 802.11b compliant radio card capable of interfacing directly with an 802.11g compliant access point and also an 802.11g compliant radio card capable of interfacing directly with an 802.11b compliant access point.

Furthermore although 802.11g compatible equipment operates in the 2.4 GHz to 2.4835 GHz frequency range, a typical transmitted signal utilizes a bandwidth of approximately 22 MHz, about a third or 30% of the total allocated bandwidth. This limits the number of non-overlapping channels utilized by an 802.11g access point to three (3). A similar scenario exists with 802.11b. Accordingly, many of the channel assignment and frequency reuse schemes associated with the 802.11b standard may be inherent in the 802.11g.

RF interference may pose additional operational problems with 802.11b and 802.11g equipment designed to operate in the 2.4 GHz portion of the electromagnetic spectrum. The 2.4 GHz portion of the spectrum is an unlicensed region which has been utilized for some time and is crowded with potential interfering devices. Some of these devices include cordless telephone, microwave ovens, intercom systems and baby monitors. Other potential interfering devices may be Bluetooth devices. Accordingly, interference poses interference problems with the 802.11b and 802.11g standards.

802.11a compatible equipment utilizes eight non-overlapping channels, as compared to three non-overlapping channels utilized by 802.11b. Accordingly, 802.11a access points may be deployed in a more dense manner than, for example 802.11b compatible equipment. For example, up to twelve access points each having a different assigned frequency may be deployed in a given area without causing co-channel interference. Consequently, 802.11a may be particularly useful in overcoming some of the problems associated with channel assignment, especially in areas that may have a dense user population and where increased throughput may be critical. Notwithstanding, the higher operating frequency of 802.11a causes more attenuation resulting in a shorter operating range at a given data rate. This may significantly increase deployment cost since a larger number of access points are required to service a given service area.

In hybrid wired/wireless networks that utilize one or more protocols in the 802.11 suite of protocols, the mobility of access devices throughout the network may pose additional challenges for conventional switches and switching equipment. Since access devices are continuously changing their point of access to the network, conventional switches may not have the capability to effectively control other network devices and/or entities in order to provide seamless communication throughout the network. Accordingly, allocation and de-allocation of certain network resources can be problematic in these networks where traffic dynamics are continuously changing. Moreover, particularly in network systems that may handle large volumes of access device traffic, providing adequate security may also pose additional problems.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide a system and method for providing a wireless access point having multiple integrated transceivers for use in a hybrid wired/wireless network. The system may include a plurality of radio interfaces that may be compatible with one or more of an 802.11a, 802.11b and 802.11g standard. A plurality of selectable channel processors may be pre-configured or dynamically configured to process channel information compatible with one or more protocols such as Bluetooth, 802.11a, 802.11b, and 802.11g.

A method for providing communication in a multi-band multi-protocol hybrid wired/wireless network may include determining a protocol associated with a communication signal for an access point. A compatible processor may be allocated to process the determined protocol. The compatible processor may be selected from a pool of available processors and subsequently utilized to process the communication signal. In one aspect of the invention, the processor may be updated with compatible protocol code that may be used for processing the communication signal. Compatible protocol code may be downloaded to the processor from a memory. The processor may associate a particular protocol code with a portion of the memory. For example, the processor may associate a particular protocol with a specific memory location where the protocol code is stored. Accordingly, the protocol code may be retrieved from the memory based on the association.

In another aspect of the invention, at least one transceiver device may be tuned to a receive frequency and a transmit frequency associated with the communication signal. This may give the access point the capability to receive the communication signal on the receive frequency and transmit the communication signal on the transmit frequency. The transmit frequency and the receive frequency pair may constitute a channel. The processor may be a digital signal processor (DSP) or other suitable channel processor, which may be configured to process protocols, including but not limited to, 802.11a, 802.11b, 802.11g, Bluetooth protocols and the like.

Another embodiment of the invention may provide a machine-readable storage, having stored thereon, a computer program having at least one code section for providing communication in a multi-band multi-protocol hybrid wired/wireless network. The at least one code section may be executable by a machine, thereby causing the machine to perform the steps as described in the method for providing communication in a multi-band multi-protocol hybrid wired/wireless network.

An embodiment of the invention may also provide a system for communicating in a multi-band multi-protocol hybrid wired/wireless network. The system may include at least one processor which may be adapted to determine a protocol which is associated with a communication signal for an access point. A compatible processor may have the capability to process the determined protocol and may be allocated from, for example, a pool of processors. The allocated processor may be subsequently utilized to process the communication signal.

At least one selector may be adapted to select the allocated processor from a pool of available processors. In one aspect of the invention, dedicated processors may be maintained to process particular protocols. Additionally, specific processors may also be adapted to process any protocol that may be handled by the system. At least one processor may be configured as an update processor, which may be adapted to update at least one other processor to be capable of processing the communication signal. Notwithstanding, the invention is not limited in this regard. Accordingly, any processor, including the update processor, may be adapted to update itself with compatible protocol code for processing a communication signal associated with any protocol.

In any case, the update processor may be further adapted to control the download of compatible protocol code, which may be utilized by the selected processor to process the communication signal. The compatible protocol code may be stored in a memory. The update processor may be configured to retrieve the compatible protocol code from a portion of the memory where the protocol code may be stored. In one aspect of the invention, the processor may associate the protocol code with a particular portion or location of the memory where the protocol code may be stored. The access point may include at least one transceiver which may be capable of tuning to a receive and a transmit frequency associated with the communication signal. The processor and/or update processor may be a digital signal processor (DSP), which may be adapted to process protocols such as 802.11a, 802.11b, 802.11g, Bluetooth or other similar protocols.

These and other advantages, aspects and novel features of the present invention, as well as details of an illustrated embodiment thereof, will be more fully understood from the following description and drawings.

DETAILED DESCRIPTION OF THE INVENTION

Aspects of the invention may include a method and system for providing a wireless access point having multiple integrated transceivers for use in a hybrid wired/wireless network. This wireless access point may be utilized for communication in a multi-band multi-protocol hybrid wired/wireless network. The method may include the step of determining a protocol that may be associated with a communication signal for an access point. A compatible processor may be allocated and selected from a pool of available processors and subsequently utilized to process the communication signal. In one aspect of the invention, the processor may be made compatible by updating it with compatible protocol code that may be used for processing the communication signal. The compatible protocol code may be downloaded to the processor from a memory. The processor may associate a particular protocol code with a portion of the memory. Accordingly, the protocol code may be retrieved from the memory based on the association. The processor may be a digital signal processor (DSP) or other suitable processor that may be capable of processing protocols, which may include but are not limited to, 802.11a, 802.11b, 802.11g and Bluetooth.

The system may include a plurality of radio interfaces that may be compatible with one or more of an 802.11a, 802.11b and 802.11g standard. A plurality of selectable channel processors may be pre-configured or dynamically configured to process channel information compatible with one or more of an 802.11a, 802.11b and 802.11g standard. The wireless access point having multiple integrated transceivers may be utilized in a mesh network such as the mesh network disclosed in U.S. application Ser. No. 10/606,565 entitled "Method and System for Providing A Mesh Network Using a Plurality of Wireless Access Points" filed on Jun. 26, 2003.

Figure 1B:
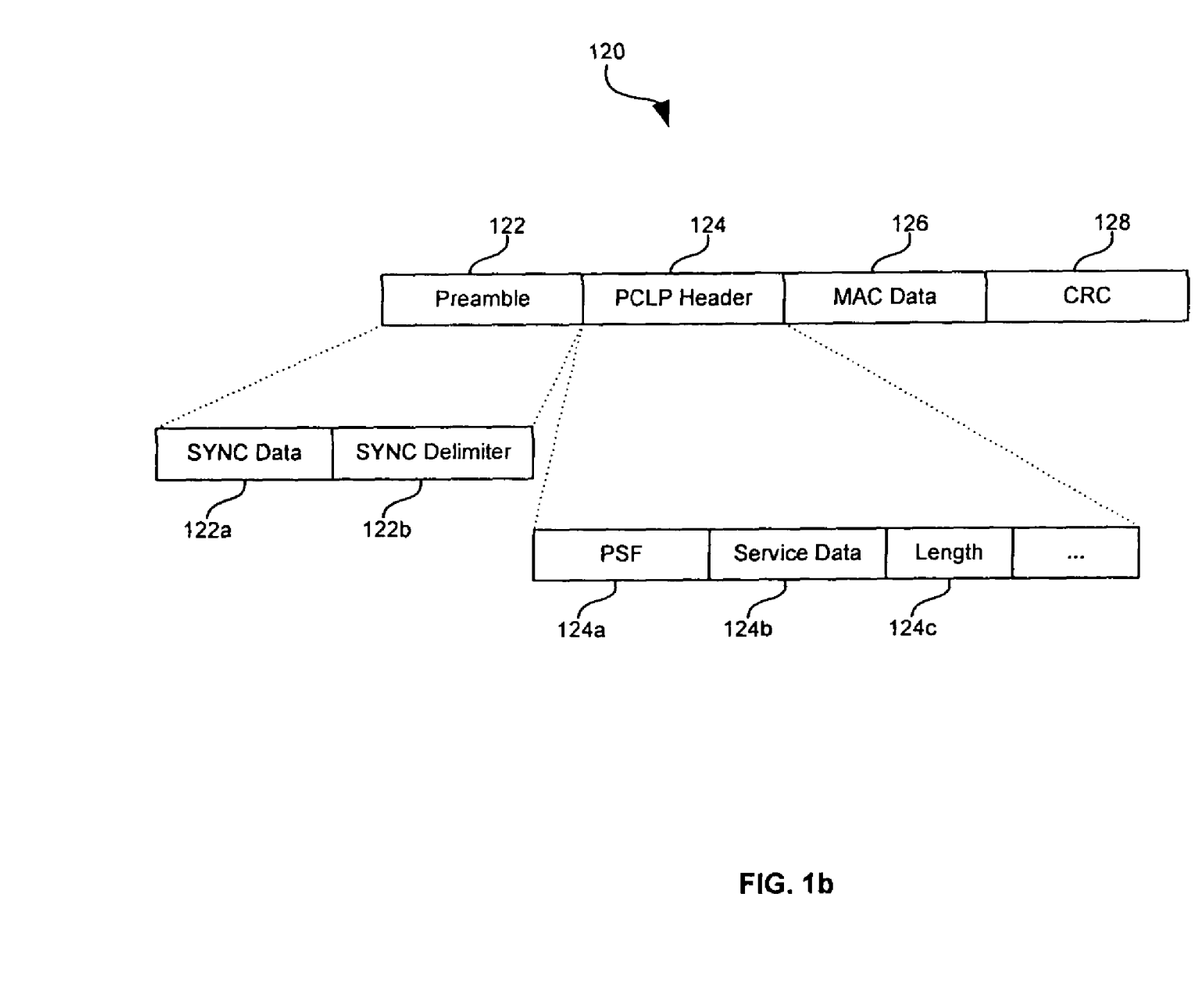
FIG. 1b is a block diagram illustrating a general PLCP frame as defined by 802.11.

FIG. 1b is a block diagram 120 illustrating a general PLCP frame as defined by 802.11. Referring to FIG. 1b, there is shown preamble 122, PLCP header 124, MAC data 126, and CRC 128. Preamble 122 may include synchronization (SYNC) data 122a and synchronization delimiter 122b. The PLCP header 124 may include, for example PLCP signal field (PSF) 124a, service data 124b, length 124c and other fields. The preamble 122 may be dependent on the PHY. The SYNC data 122a may include a unique bit stream that may be adapted to signal timing parameters such as the start of a frame. The SYNC data 122a is used for bit synchronization and demodulation. The SYNC delimiter 122b provides frame timing information and may be adapted to delimit the end of synchronization information. The PLCP header 124 may be adapted to contain information used for decoding the frame. For example, the PSF 124a may be adapted to include communication data rate information. The service data 124b is generally reserved, but may be utilized to provide application specific functionality. The length 124c may be adapted to indicate the length of the MAC data 126. In this regard, the length 124c may be expressed in terms of the time required to transmit the MAC data 126.

Figure 1C:
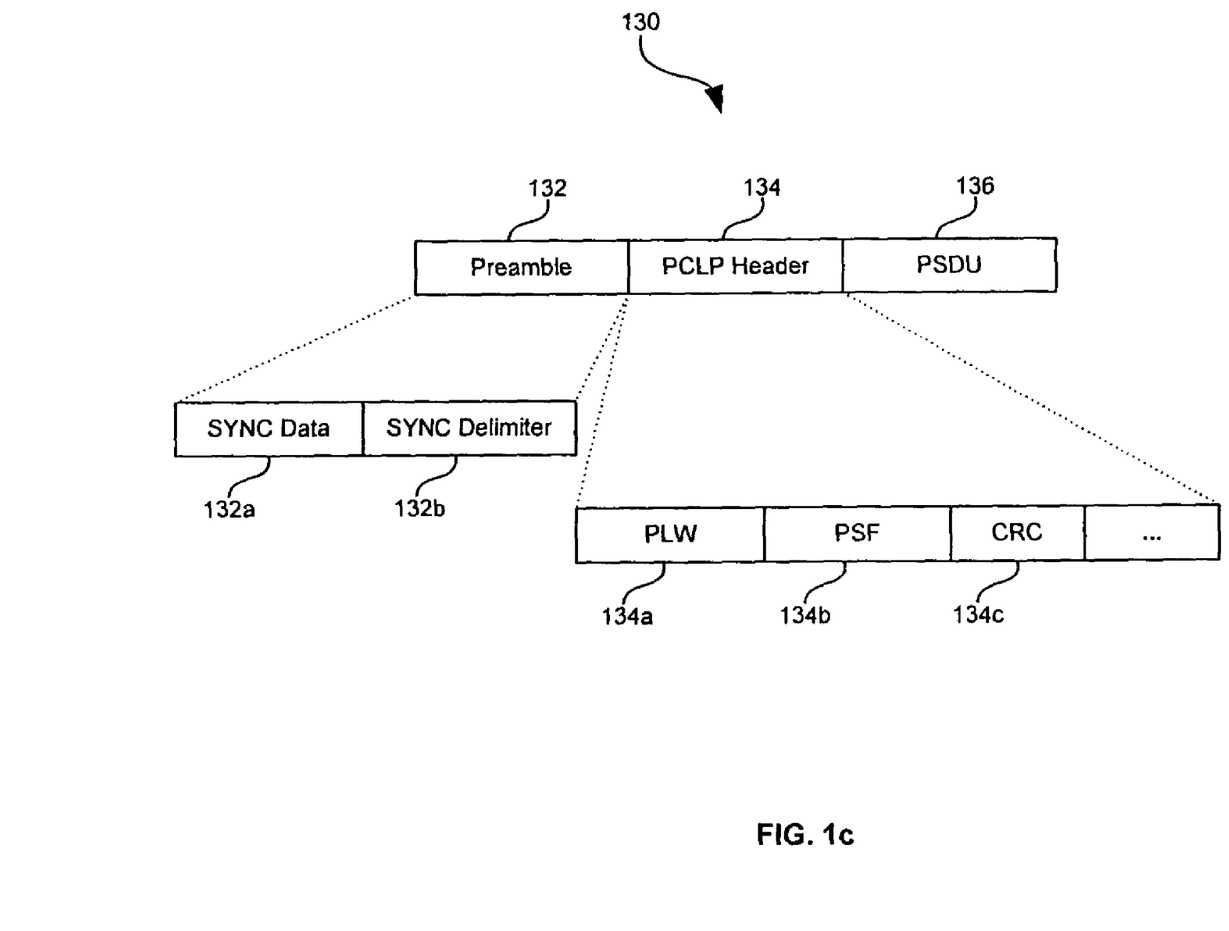
FIG. 1c is a block diagram illustrating a PLCP frame utilized by frequency hopping spread spectrum as defined by 802.11.

FIG. 1c is a block diagram 130 illustrating a PLCP frame utilized by frequency hopping spread spectrum as defined by 802.11. Referring to FIG. 1c, there is shown a SYNC data 132, PLCP header 134 and PSDU 136. The PLCP header 134 may include, for example, PSDU length word (PLW) 134a, PLCP signaling field (PSF) 134b, header error check field or CRC 134c and other fields. The PLW 134a may specify the number of octets contained in the PSDU 136. The PSF 134 be may be 4-bits in length and may be used to denote the communication data rate.

Figure 1D:
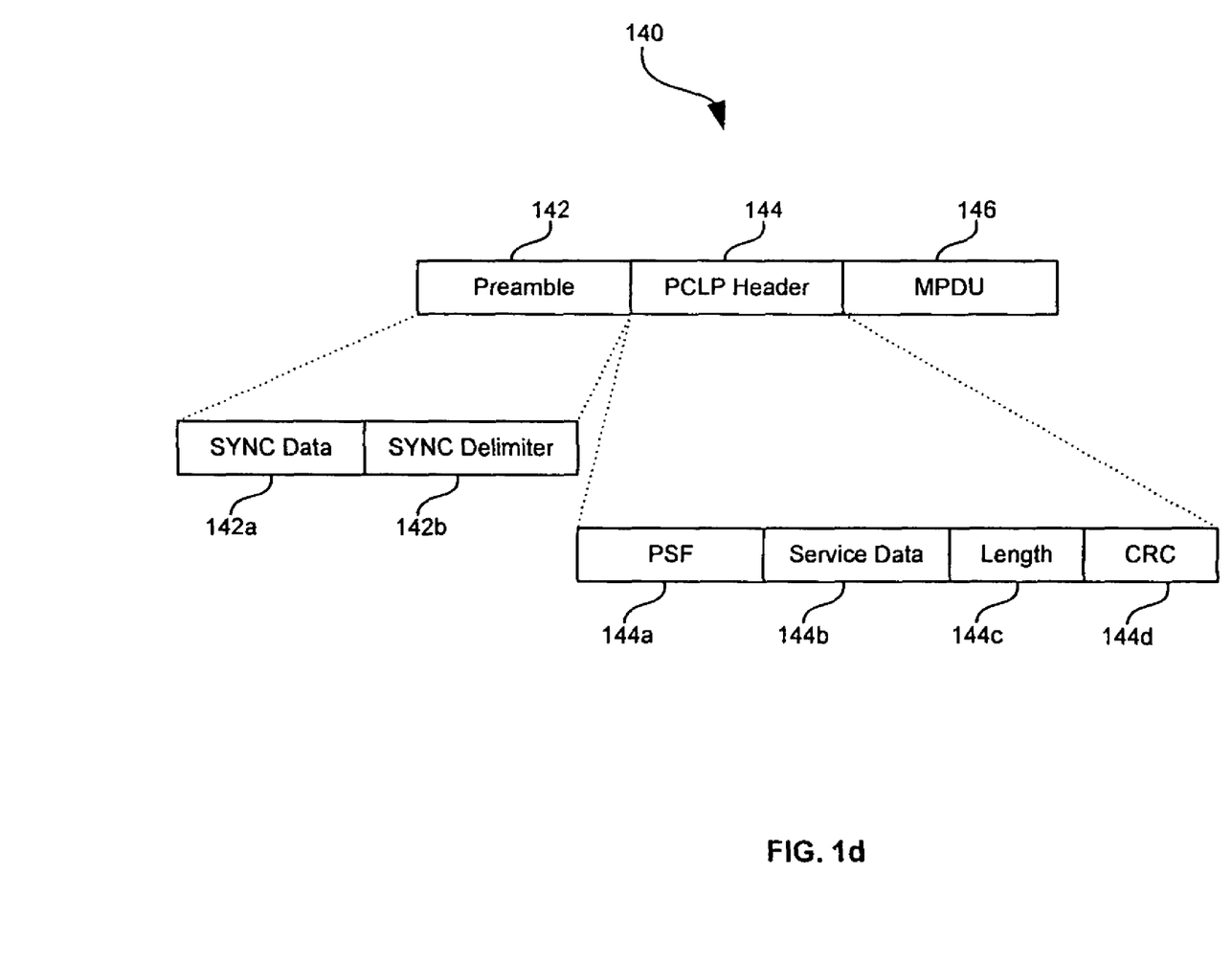
FIG. 1d is a block diagram illustrating a PLCP frame for direct sequence spread spectrum and high rate direct sequence spread spectrum as defined by 802.11.

FIG. 1d is a block diagram 140 illustrating a PLCP frame for direct sequence spread spectrum and high rate direct sequence spread spectrum (HR-DSS) as defined by 802.11. Referring to FIG. 1d, there is shown preamble 142, PLCP header 144 and MPDU 146. Preamble 142 may include synchronization (SYNC) data 142a and synchronization delimiter 142b. The PLCP header 144 may include PLCP signal field (PSF) 144a, service data 144b, length 144c, and CRC field 144d. The SYNC data 142a may be 128 bits as compared to 8 bits for SYNC data 132a for frequency hopping spread spectrum. The CRC 144d is 16 bits, which is similar to CRC 134c for frequency hopping spread spectrum.

Figure 1E:
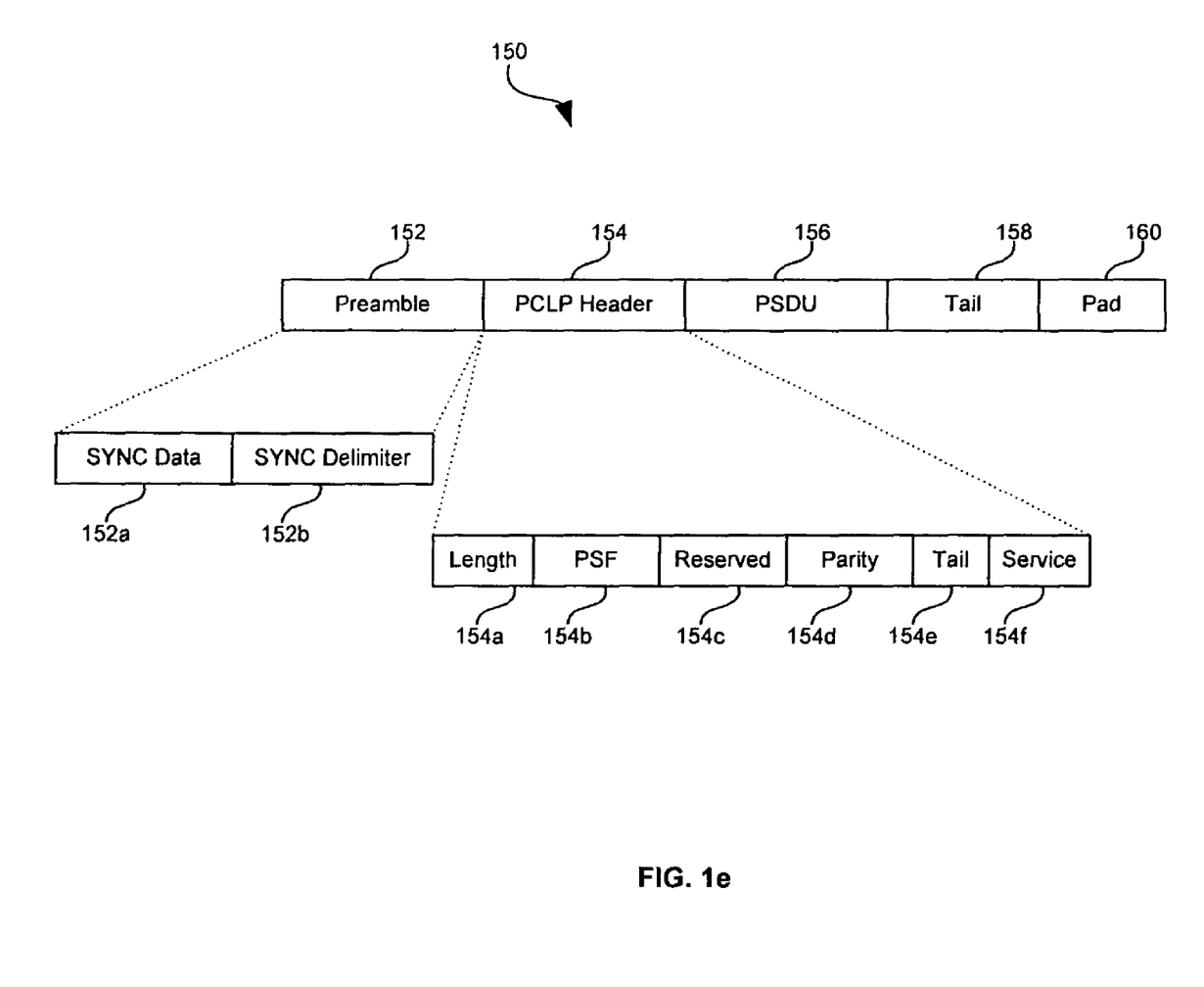
FIG. 1e is a block diagram illustrating a PLCP frame for orthogonal frequency division multiplexing as defined by 802.11.

FIG. 1e is a block diagram 150 illustrating a PLCP frame for orthogonal frequency division multiplexing as defined by 802.11. Referring to FIG. 1e, there is shown preamble 152, PLCP header 154 and PSDU 156, tail 158 and pad 160. Preamble 152 may include synchronization (SYNC) data 152a and synchronization delimiter 152b. The PLCP header 154 may include length 154a, PLCP signal field (PSF) 154b, reserved field 154c, parity 154d, tail 154e and service 154f. The length 154a is a 12-bit field that may be adapted to indicate the length of the frame. The PSF 154b is a 4-bit field that may indicate a modulation scheme utilized and its associated coding rate of the PSDU. For example, the specification utilizes binary 1011 to represent 6 Mbps, 1111 to represent 9 Mbps, 1010 to represent 12 Mbps, 1110 to represent 18 Mbps, 1001 to represent 24 Mbps, 1011 to represent 36 Mbps, 1000 to represent 48 Mbps and finally, 1100 to represent the maximum standardized rate if 54 Mbps. The reserved field 154c is a 1-bit field that is reserved for future use and may be adapted for application specific use. The parity field 154d may indicate odd or even parity. The tail field 154e is a 6-bit field. The service field 154f is a 16-bit field that may be adapted to indicate the type of service.

In accordance with the invention, a multi-band, multi-protocol access point may be adapted to provide service to one or more of a plurality of access devices which may operate in one or more of a plurality of communication bands. For example, a first access device may be capable of operating on an 802.11a compatible channel. Similarly, a second access device may be capable of operating on an 802.11b compatible channel. A third access device may be capable of operating on a 802.11g compatible channel. Finally, a fourth access device may be capable of operating on an 802.11a and 802.11b compatible channels. Accordingly, the multi-band multi-protocol access point may be adapted to provide communication service to any of the first, second, third and/or fourth access devices that may be located within its service or coverage area. In this regard, the multi-band multi-protocol access point may include one or more transceivers capable of operating on 802.11a, 802.11b and 802.11g communication bands or frequencies.

Figure 2:
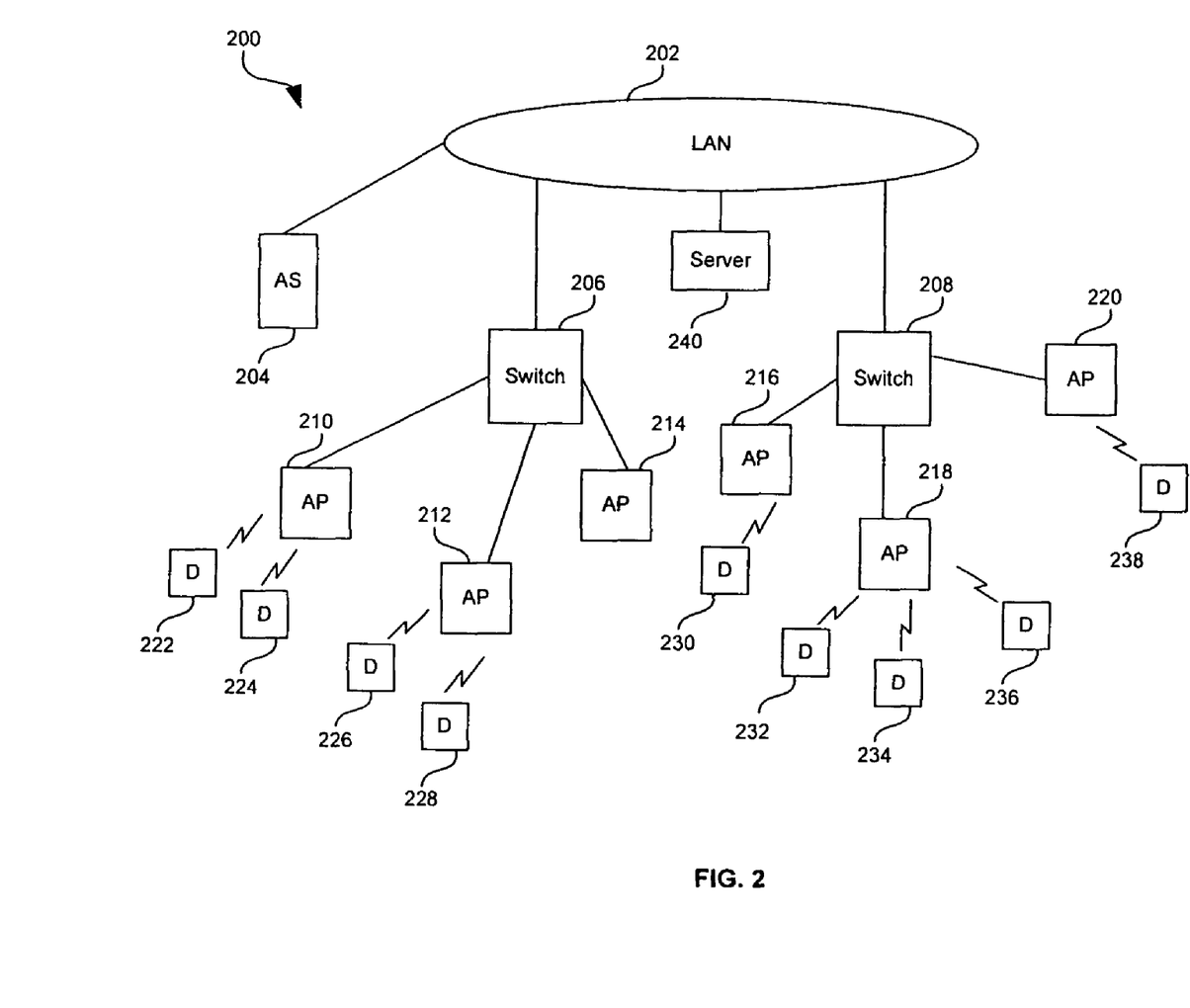
FIG. 2 is a block diagram of an exemplary multi-band multi-protocol hybrid wired/wireless network that may utilize multiple integrated transceivers in accordance with an embodiment of the invention

FIG. 2 is a block diagram 200 of an exemplary multi-band multi-protocol hybrid wired/wireless network that may utilize multiple integrated transceivers in accordance with an embodiment of the invention. Referring to FIG. 2, there is shown, a local area network (LAN) 202, authentication server 204, switches 206, 208, access points (APs) 210, 212, 214, 216, 218, 220 and access devices 222, 224, 226, 228, 230, 232, 234, 236, 238. The block diagram 202 may be representative of an Enterprise WLAN although the invention is not so limited.

The LAN 202 may be adapted to provide a transport medium between switch 206 and switch 208. Access points 216, 218, 220 may be coupled to switch 208. For illustrative purposes, access points 216, 218, 220 may be 802.11a and 802.11b compliant. In addition, access point 218 may be Bluetooth compliant. In this regard, the access points 216, 218, 220 may include multiple transceivers that may be configured to operate on different communication bands and/or one or more multi-band multi-protocol transceivers. Access point 216 may provide service to access device or client 230, which may be, for example, an 802.11b compliant device. Access point 218 may provide service to access devices or clients 232, 234, 236 which may be located within a coverage area of access point 218. Access device 232 may be 802.11a compliant and access device 234 may be 802.11g compliant. Access device 236 may be 802.11b and Bluetooth compliant. Finally, access point 220 may provide service to access device 238 which may be located within the service area of access point 220. The access device or client 238 may be 802.11g compliant.

For illustrative purposes, access points 210, 212, 214 may be 802.11g compliant. In addition, access point 212 may be Bluetooth compliant. In this regard, the access points 210, 212, 214 may include multiple transceivers that may be configured to operate on different communication bands and/or one or more of a plurality of multi-band multi-protocol transceivers. Access point 210 may provide service to access devices or clients 222, 224, which may be located within a coverage area of access point 210. Access device 222 may be an 802.11a compliant device and access device 224 may be an 802.11g compliant device, for example. Access point 212 may provide service to access devices or clients 226, 228, which may be located within a coverage area of access point 212. Access device 226 may be 802.11a compliant and access device 228 may be 802.11g and Bluetooth compliant.

In operation, an originating access device such as access device 228 may initiate a communication session with a terminating access device or client such as access device 234. Upon initiation of the communication session, access point 212 may request that switch 206 establish a virtual circuit connecting the originating access device 228 and the terminating access device 234. A network management process associated with one or more of switches 206, 208 and/or access points 212, 218 may be adapted to acquire information from the super channel layer in order to determine a most efficient path for accommodating the communication session. In this regard, one or more different channels and/or communication bands may be utilized to provide communication between the initiating and terminating access devices.

In one aspect of the invention, one or more of a plurality of processes may be utilized to select a most efficient path for accommodating the communication session. Any one or more of a network management process, a load management process, a bandwidth management process, a session control process and a QoS management process may be adapted to acquire information from the super channel layer and determine, for example, an appropriate channel that may be utilized for the communication session. In this regard, the appropriate channel may be selected so that adjacent or co-channel interference may be minimal, a particular load balance may be maintained, a minimum QoS may be maintained, and/or bandwidth efficiently utilized throughout the network.

Figure 3:
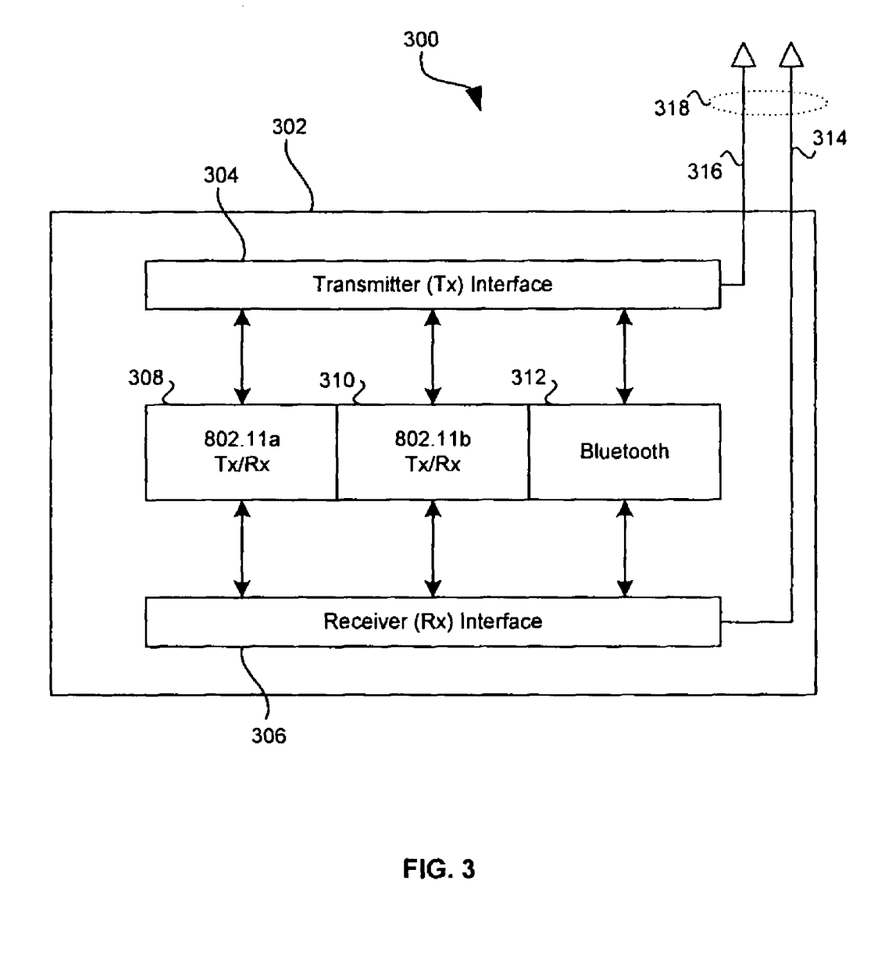
FIG. 3 is a block diagram of a wireless access point having a plurality of transceivers in accordance with an embodiment of the invention.

FIG. 3 is a block diagram 300 of a wireless access point having a plurality of transceivers in accordance with an embodiment of the invention. Referring to FIG. 3, there is shown a wireless access point 302 having a transmitter interface block 304, a receiver interface block 306, 802.11a transceiver block 308, 802.11b transceiver block 310 and Bluetooth transceiver block 312. An antenna 218 may include a transmitter element 316 and a receiver element 314.

The 802.11a transceiver block 308, 802.11b transceiver block 310 and Bluetooth transceiver block 312 may be coupled to the receiver interface block 306 and the transmitter interface block 304. The transmitter element 316 of the antenna 318 may be coupled to the transmitter interface 304. Similarly, the receiver element 314 of the antenna 318 may be coupled to the receiver interface 306.

The 802.11a transceiver block 308 and 802.11b transceiver block 310 may include one or a plurality of processing elements that may be adapted to transmit and/or receive 802.11a, 802.11b, and/or 802.11g protocol formatted data. The Bluetooth transceiver block 312 may include one or a plurality of processing elements that may be adapted to transmit and/or receive Bluetooth protocol formatted data. In this regard, one or more processors such as a digital signal processor (DSP) may be adapted to process information related one or a plurality of channels associated with an access point. An 802.11g compatible signal may be processed by either the 802.11a transceiver block 308 or 802.11b transceiver block 310.

Figure 4:
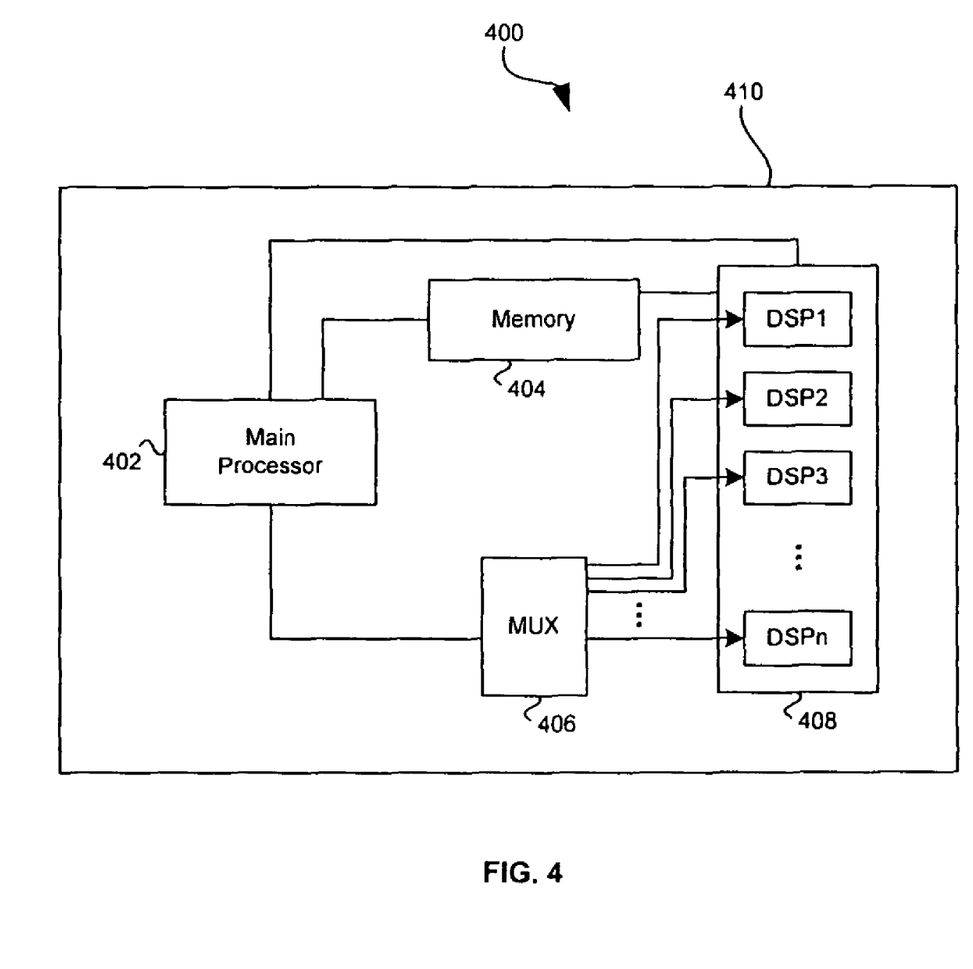
FIG. 4 is a block diagram of an exemplary transceiver block having a plurality of processing elements in accordance with an embodiment of the invention.

FIG. 4 is a block diagram of an exemplary transceiver block 410 having a plurality of processing elements in accordance with an embodiment of the invention. Referring to FIG. 4, the transceiver block 410 may include a main processor 402, memory 404, multiplexer (MUX) 406 and a DSP block 408. MUX 406 may be adapted to function as a selector.

The main processor 402 may be any suitable microprocessor or microcontroller that may be adapted to control processing tasks associated with the transceiver block 408. The DSP block 408 may be adapted to include a pool of DSPs that may be selected by the multiplexer 406. Accordingly, any one or more of the DSPs DSP1, DSP2, DSP3, . . . , DSPn may be selected by the multiplexer or selector 406. In one aspect of the invention, any one or more of the DSPs DSP1, DSP2, DSP3, . . . , DSPn may be preconfigured to process channel information formatted for a particular one of an 802.11a, 802.11b, Bluetooth and 802.11g protocol. In another embodiment of the invention, any one or more of the DSPs DSP1, DSP2, DSP3, . . . , DSPn may be dynamically configured to process channel information formatted for any one or more of an 802.11a, 802.11b, Bluetooth and 802.11g protocol. The memory block 404 may be any suitable memory that may be adapted to store, for example, code related to the processing of any one or more of an 802.11a, 802.11b, Bluetooth and/or 802.11g protocol.

In operation, the main processor 402 may control the receipt of information from a channel or the transmission of information on a particular channel associated with the wireless access point. The main processor 402 may be adapted to determine an appropriate protocol associated with the processing of the particular channel. Accordingly, the main processor 402 may be adapted to control the multiplexer 406 to select at least one appropriate available DSP from the pool of DSPs in the DSP block 408. In one aspect of the invention, the at least one selected DSP may be preconfigured to process information for a particular protocol. In another embodiment of the invention, the main processor 402 may be adapted to select an appropriate code from the memory 404 to be used for processing the particular channel. In this regard, the selected appropriate code may be downloaded to the selected DSP and utilized for processing information related to the particular channel.

In an embodiment of the invention, the main processor 402 may be adapted to determine a protocol that is associated with a communication signal for an access point. A compatible processor capable of processing the determined protocol may be allocated from, for example, a pool of processors. In this regard, main processor 402 may allocate one of DSP1, DSP2, DSP3, . . . , DSPn from the pool of DSPs 408 to process to process the communication signal. In general, selector 406 may be configured to select an available DSP from the pool of available DSPs 408. Assuming DSP1 is allocated, selector 408 may select DSP1 to process the communication signal. DSP1 may be subsequently utilized to process the communication signal.

In one aspect of the invention, dedicated processors may be maintained to process particular protocols. For example, DSP2 may be configured to process only 802.11a communication signals. Additionally, specific processors may also be adapted to process any protocol that may be handled by the system. In this regard, DSP3 may be adapted to process any protocol that may be handled by the system. Accordingly, DSP3 may be dynamically configured to process any of an 802.11a, 802.11b, 802.11g and Bluetooth protocol.

In another aspect of the invention, at least one of the DSPs may be configured as an update processor. The update processor may be adapted to update at least one other processor with protocol code capable of processing the communication signal. Notwithstanding, the invention is not limited in this regard. For example, DSP1 may be configured as an update processor which may be utilized to update DSP2, DSP2, . . .

, DSPn. An update processor may also be configured to update itself with compatible protocol code. Accordingly, any DSP may be adapted to update itself with compatible protocol code for processing any protocol. The main processor 402 may also be adapted to function as an update processor. In this regard, the main processor may update any of the DSPs with protocol code for processing a communication signal.

In any case, the update processor 402, for example, may be further adapted to download compatible protocol code to a DSP. The compatible protocol code may be stored in a portion of the memory 404. The update processor 402 may be configured to retrieve the compatible protocol code from the portion of the memory where it is stored. In order to locate the compatible protocol code, the update processor 402 may associate the protocol code with a particular portion of the memory where the protocol code may be stored. A DSP such as DSP2 may also be adapted to locate protocol code stored in the memory 404. DSP2 may subsequently retrieve or download the protocol code whenever it is required.

In accordance with another aspect of the invention, the access point may include at least one transceiver which may be capable of tuning to a receive and a transmit frequency associated with the communication signal. The processor and/or update processor may be a digital signal processor (DSP) or other suitable communication processor that may be adapted to process 802.11a, 802.11b, 802.11g, Bluetooth or other similar protocol. The transceiver may be adapted to utilize a single protocol stack for processing multi-band multi-protocol communication signals. In this regard, a single stack containing a single multi-protocol layer may be utilized by the DSPs 408 and/or main processor 402 to process communication signals associated with different protocols. U.S. patent application Ser. No. 10/658,161 entitled "Method and System for Providing a Super Channel in a Multi-band Multi-protocol Hybrid Wired/Wireless Network" filed on Sep. 9, 2003 describes a method and system for processing multi-band, multi-protocol signals and is incorporated herein by reference in its entirety.

In accordance with various embodiments of the invention, dependent on the modulation scheme utilized, one or more of the PLCP frames illustrated in FIG. 1*b*, FIG. 1*c*, FIG. 1*d* and FIG. 1*e* may be adapted to contain information which may be utilized for providing communication between the plurality of access points in one or more networks in accordance the embodiments of the invention. For example, one or more of the fields in the PLCP frames may be used to determine an appropriate protocol associated with information related to a particular channel. In this regard, the main processor 302 may be adapted to determine an appropriate processing code based on one or more fields in the PLCP frame. Additionally, the PLCP frames may be adapted to convey information for any one or more of the 801.11a, 802.11b and 802.11g modes of operation utilized by access points and/or access devices in accordance the embodiments of the invention.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for providing communication in a multi-band multi-protocol hybrid wired/wireless network, the method comprising:

tuning at least one transceiver device to at least one of a receive and a transmit frequency associated with a communication signal;

determining by an access point, a protocol associated with said communication signal for said access point, said protocol corresponding to one of a wireless personal area network protocol and a wireless local area network protocol;

allocating, based on said determined protocol, one of a plurality of processors within said access point, each respective one of said plurality of processors being dedicated to process a respective one of a plurality of different protocols;

updating said allocated one of said plurality of processors to be capable of processing said determined protocol; and processing said communication signal by said allocated one of said plurality of processors within said access point.

2. The method according to claim 1, wherein said updating comprises downloading protocol code compatible with said determined protocol to said processor.

3. The method according to claim 2, comprising storing said compatible protocol code in a memory.

4. The method according to claim 3, wherein said downloading comprises retrieving said compatible protocol code from a portion of said memory.

5. The method according to claim 4, comprising associating said determined protocol code with said portion of said memory.

6. The method according to claim 1, wherein said allocated processor is a digital signal processor (DSP).

7. The method according to claim 1, wherein said protocol is one of an 802.11a, 802.11b, 802.11g and Bluetooth protocol.

8. A non-transitory computer-readable medium, having stored thereon, a computer program having at least one code section for providing communication in a multi-band multi-protocol hybrid wired/wireless network, the at least one code section being executable by a computer for causing the computer to perform steps comprising:
   tuning at least one transceiver device to at least one of a receive and a transmit frequency associated with a communication signal;
   determining by an access point, a protocol associated with said communication signal for said access point, said protocol corresponding to one of a wireless personal area network protocol and a wireless local area network protocol;
   allocating, based on said determined protocol, one of a plurality of processors within said access point, each respective one of said plurality of processors being dedicated to process a respective one of a plurality of different protocols;
   updating said allocated one of said plurality of processors to be capable of processing said determined protocol; and
   processing said communication signal by said allocated one of said plurality of processors within said access point.

9. The non-transitory computer-readable medium according to claim 8, comprising code for downloading protocol code that is compatible with said determined protocol to said processor.

10. The non-transitory computer-readable medium according to claim 9, comprising code for storing said compatible protocol code in a memory.

11. The non-transitory computer-readable medium according to claim 10, comprising code for retrieving said compatible protocol code from a portion of said memory.

12. The non-transitory computer-readable medium according to claim 11, comprising code for associating said determined protocol code with said portion of said memory.

13. The non-transitory computer-readable medium according to claim 8, wherein said allocated processor is a digital signal processor (DSP).

14. The non-transitory computer-readable medium according to claim 8, wherein said protocol is one of an 802.11a, an 802.11b, an 802.11g and Bluetooth protocol.

15. A system for providing communication in a multiband multi-protocol hybrid wired/wireless network, the system comprising:
   at least one first processor in an access point, said at least one processor being configured to:
      tune at least one transceiver device to at least one of a receive and a transmit frequency associated with a communication signal;
      determine a protocol associated with said communication signal for said access point, said protocol corresponding to one of a wireless personal area network protocol and a wireless local area network protocol;
      allocate, based on said determined protocol, one of a plurality of second processors within said access point, each respective one of said plurality of second processors being dedicated to process a respective one of a plurality of different protocols; and
      update said allocated one of the plurality of second processors to be capable of processing said determined protocol.

16. The system according to claim 15, wherein said updating enables downloading protocol code compatible with said determined protocol to said allocated second processor.

17. The system according to claim 16, comprising a memory for storing said compatible protocol code.

18. The system according to claim 17, wherein said updating enables retrieving said compatible protocol code from a portion of said memory.

19. The system according to claim 18, wherein said first processor enables associating said determined protocol code with said portion of said memory.

20. The system according to claim 15, wherein one or both of said first processor and/or said allocated second processor is a digital signal processor (DSP).

21. The system according to claim 20, wherein said protocol is one of an 802.11a, an 802.11b, an 802.11g, and a Bluetooth protocol.

22. The system according to claim 21, wherein said access point utilizes a single protocol stack for processing said communication signal for said 802.11a, 802.11b, 802.11g, and Bluetooth protocols.

23. A system for providing communication in a multiband multi-protocol hybrid wired/wireless network, the system comprising:
   means for tuning at least one transceiver device in an access point to at least one of a receive and a transmit frequency associated with a communication signal;
   means for determining a protocol associated with said communication signal for said access point, said protocol corresponding to one of a wireless personal area network protocol and a wireless local area network protocol;
   means for allocating, based on said determined protocol, one of a plurality of processors within said access point, each respective one of said plurality of processors being dedicated to process a respective one of a plurality of different protocols; and
   means for updating said allocated one of the plurality of processors to be capable of processing said determined protocol.

24. The system according to claim 23, wherein said updating enables downloading protocol code compatible with said determined protocol to said allocated second processor.

25. The system according to claim 24, comprising a memory for storing said compatible protocol code.

26. The system according to claim 25, wherein said updating enables retrieving said compatible protocol code from a portion of said memory.

27. The system according to claim 26, wherein said first processor enables associating said determined protocol code with said portion of said memory.

28. The system according to claim 23, wherein one or both of said first processor and/or said allocated second processor is a digital signal processor (DSP).

29. The system according to claim 23, wherein said determined protocol is one of an 802.11a, an 802.11b, an 802.11g, and a Bluetooth protocol.

30. The system according to claim 23, wherein said access point utilizes a single protocol stack for processing said communication signal for said 802.11a, 802.11b, 802.11g, and Bluetooth protocols.

* * * * *